United States Patent
Onishi

(10) Patent No.: US 9,225,475 B2
(45) Date of Patent: Dec. 29, 2015

(54) WIRELESS COMMUNICATION DEVICE AND CONTROL METHOD THEREOF

(75) Inventor: Kazuo Onishi, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 18 days.

(21) Appl. No.: 13/581,080

(22) PCT Filed: Feb. 23, 2011

(86) PCT No.: PCT/JP2011/053905
§ 371 (c)(1),
(2), (4) Date: Aug. 24, 2012

(87) PCT Pub. No.: WO2011/105393
PCT Pub. Date: Sep. 1, 2011

(65) Prior Publication Data
US 2012/0320829 A1 Dec. 20, 2012

(30) Foreign Application Priority Data
Feb. 24, 2010 (JP) .................. 2010-038365

(51) Int. Cl.
| H04J 3/16 | (2006.01) |
| H04L 1/18 | (2006.01) |
| H04W 36/00 | (2009.01) |
| H04W 88/02 | (2009.01) |
| H04L 1/00 | (2006.01) |

(52) U.S. Cl.
CPC ............ *H04L 1/1832* (2013.01); *H04L 1/0002* (2013.01); *H04W 36/00* (2013.01); *H04W 88/02* (2013.01)

(58) Field of Classification Search
None
See application file for complete search history.

(56) References Cited

U.S. PATENT DOCUMENTS

| 6,697,378 B1* | 2/2004 | Patel ............................ 370/468 |
| 2003/0031161 A1* | 2/2003 | Froehlich et al. ............. 370/349 |
| 2003/0092392 A1* | 5/2003 | Komandur et al. .......... 455/67.1 |

(Continued)

FOREIGN PATENT DOCUMENTS

| JP | 2003-078560 | 3/2003 |
| JP | 2005-286530 | 10/2005 |
| JP | 2006-005561 A | 1/2006 |
| JP | 2006-180412 A | 7/2006 |
| JP | 2006-180413 A | 7/2006 |
| JP | 2008-252311 A | 10/2008 |
| JP | 2008-289080 A | 11/2008 |

OTHER PUBLICATIONS

International Search Report for PCT/JP2011/053905 Mailed Mar. 22, 2011.

(Continued)

*Primary Examiner* — Kevin C Harper
(74) *Attorney, Agent, or Firm* — Hauptman Ham, LLP

(57) ABSTRACT

To provide a wireless communication device that can suppress data loss due to reduction in line speed in accordance with hand-down, to thereby improve throughput, and a control method thereof. A cellular telephone device 1 that is connected to a PC 100 and provides data packets received from a server 300 via wireless communication to the PC 100, includes: a wireless communication unit 40 that can establish data communication by connecting to the server 300 both in LTE and CDMA2000_1x that is of lower speed than LTE; and a control unit 30 that, in a case in which, during communication by the wireless communication unit 40 using LTE, communication is handed down to CDMA2000_1x due to reduction in communication quality to a first threshold, reduces an RWIN to be notified to the server 300 from the size before hand-down.

10 Claims, 8 Drawing Sheets

(56) References Cited

U.S. PATENT DOCUMENTS

| | | | |
|---|---|---|---|
| 2004/0136527 A1* | 7/2004 | Struik | 380/28 |
| 2005/0088972 A1* | 4/2005 | Zhang et al. | 370/235 |
| 2005/0107084 A1* | 5/2005 | Dyck et al. | H04W 28/16 455/436 |
| 2007/0280273 A1* | 12/2007 | Yun et al. | 370/401 |
| 2009/0201886 A1* | 8/2009 | Lee et al. | 370/335 |
| 2010/0329135 A1* | 12/2010 | Pelletier et al. | 370/252 |

OTHER PUBLICATIONS

Notice of Reasons for Rejection issued to JP Application No. 2010-038365, mailed Feb. 12, 2014.

* cited by examiner

WIRELESS COMMUNICATION DEVICE AND CONTROL METHOD THEREOF

CROSS-REFERENCE TO RELATED APPLICATIONS

This application is the National Stage of International Application No. PCT/JP2011/053905, filed Feb. 23, 2011, which claims the benefit of Japanese Application No. 2010-038365, filed Feb. 24, 2010, the entire contents of all of which are incorporated by reference herein.

FIELD OF THE INVENTION

The present invention relates to a wireless communication device that establishes wireless communication by TCP (Transmission Control Protocol) and a control method thereof.

BACKGROUND OF THE INVENTION

Conventionally, a wireless communication device is known that is connected to a data processing device such as a PC and mediates transmission of a TCP data packet between the data processing device and a communication counterpart. A cellular telephone and a card-type terminal can be exemplified as the wireless communication device. Such a wireless communication device often can communicate by a plurality of communication systems, for example CDMA2000_1x and LTE (Long Term Evolution), and the like.

In communication by TCP, window control is employed for efficient data transfer. In the window control, a data receiver gives notification of receive buffer size (RWIN, Receive Window) to a data sender. The data sender thus can send data of a size corresponding to the RWIN without waiting for acknowledge (ACK) from the receiver. Here, if the RWIN is too small with respect to the line speed, data transfer efficiency and throughput are reduced. On the other hand, if the RWIN is too large with respect to the line speed, retransmission processing due to data loss requires time, leading to reduced throughput.

If communication quality is reduced during data reception by the data processing device, the wireless communication device can perform hand-off (hand-down) from a high-speed communication system (for example, LTE) to a low-speed communication system (for example, CDMA2000_1x). In such a case, the line speed is drastically reduced and control for appropriately changing the data transmission speed is required. For example, Patent Document 1 proposes a control method that reconfigures a maximum segment size (MSS) based on information (maximum throughput) of a communication system after hand-off.

Patent Document 1: Japanese Unexamined Patent Application, Publication No. 2008-252311

SUMMARY OF THE INVENTION

Problems to be Solved by the Invention

However, in a case in which the wireless communication device mediates transmission of data packets in connection with the data processing device, it is difficult for the data processing device to detect hand-off in the wireless communication device. Therefore, even with the control method of Patent Document 1, timely control of data transfer speed has been difficult. In other words, there has been a problem in that potential throughput cannot be maintained until reduction of line speed is indirectly detected based on round-trip time and the like.

The present invention is aimed at providing a wireless communication device that can suppress data loss due to reduction in line speed in accordance with hand-down, to thereby improve throughput, and a control method thereof.

Means for Solving the Problems

A wireless communication device according to the present invention, which is connected to a data processing device and provides data packets received from a predetermined communication counterpart via wireless communication to the data processing device, includes: a wireless communication unit that can establish data communication by connecting to the communication counterpart both in a first communication system and a second communication system that is of lower speed than the first communication system; and a control unit that, in a case in which, during communication by the wireless communication unit using the first communication system, hand-down to the second communication system due to reduction in communication quality to a first threshold, reduces a receiving window size to be notified to the communication counterpart from the size before hand-down.

In addition, it is preferable that: the size of the receiving window is specified in an acknowledge packet that is sent by the data processing device in response to a data packet received from the communication counterpart; and the control unit rewrites the receiving window size specified in the acknowledge packet and forwards the acknowledge packet to the communication counterpart.

In addition, it is preferable that the control unit forwards the acknowledge packet without rewriting the size of the receiving window in a case in which the receiving window size specified in the acknowledge packet is usable in the second communication system.

In addition, it is preferable that, in a case in which the communication quality by the wireless communication unit in the first communication system is reduced to a second threshold that is higher than the first threshold, the control unit sets the receiving window size to be notified to the communication counterpart to 0.

In addition, it is preferable that, in a case in which hand-down to the second communication system occurs after setting the receiving window size to 0, the control unit gives notification of the receiving window size that is usable in the second communication system.

In addition, it is preferable that, in a case in which hand-down to the second communication system does not occur after setting the receiving window size to 0, the control unit gives notification of the receiving window size value before being set to 0.

In addition, it is preferable that the wireless communication device according to the present invention further includes a storage unit that stores a copy of the acknowledge packet forwarded by the control unit, in which, in a case in which a subsequent acknowledge packet is not sent from the data processing device for a predetermined amount of time after setting the receiving window size to 0, the control unit forwards the copy of the acknowledge packet stored in the storage unit after rewriting the receiving window size specified therein.

In addition, it is preferable that, in a case in which the acknowledge packet sent from the data processing device is compressed, the control unit converts the compressed acknowledge packet into an uncompressed acknowledge packet in which the receiving window size is specified, and then forwards the acknowledge packet after rewriting the receiving window size.

In addition, it is preferable that the receiving window size is a window size to be notified to the communication counterpart in a TCP layer.

A control method according to the present invention, in which a wireless communication device that is connected to a data processing device provides data packets received from a predetermined communication counterpart via wireless communication to the data processing device, the wireless communication device including a wireless communication unit that can establish data communication by connecting to a predetermined communication counterpart in any of a first communication system and a second communication system that is of lower speed than the first communication system, includes a step of reducing a receiving window size to be notified to the communication counterpart from the size before hand-down, in a case in which, during communication by the wireless communication unit using the first communication system, hand-down to the second communication system due to reduction in communication quality to a first threshold.

Effects of the Invention

According to the present invention, data loss due to reduction in line speed in accordance with hand-down can be suppressed, and throughput can thus be improved.

DETAILED DESCRIPTION OF THE INVENTION

An embodiment of the present invention is described hereinafter. In the present embodiment, a cellular telephone device 1 is described as an example of the wireless communication device.

Figure 1:
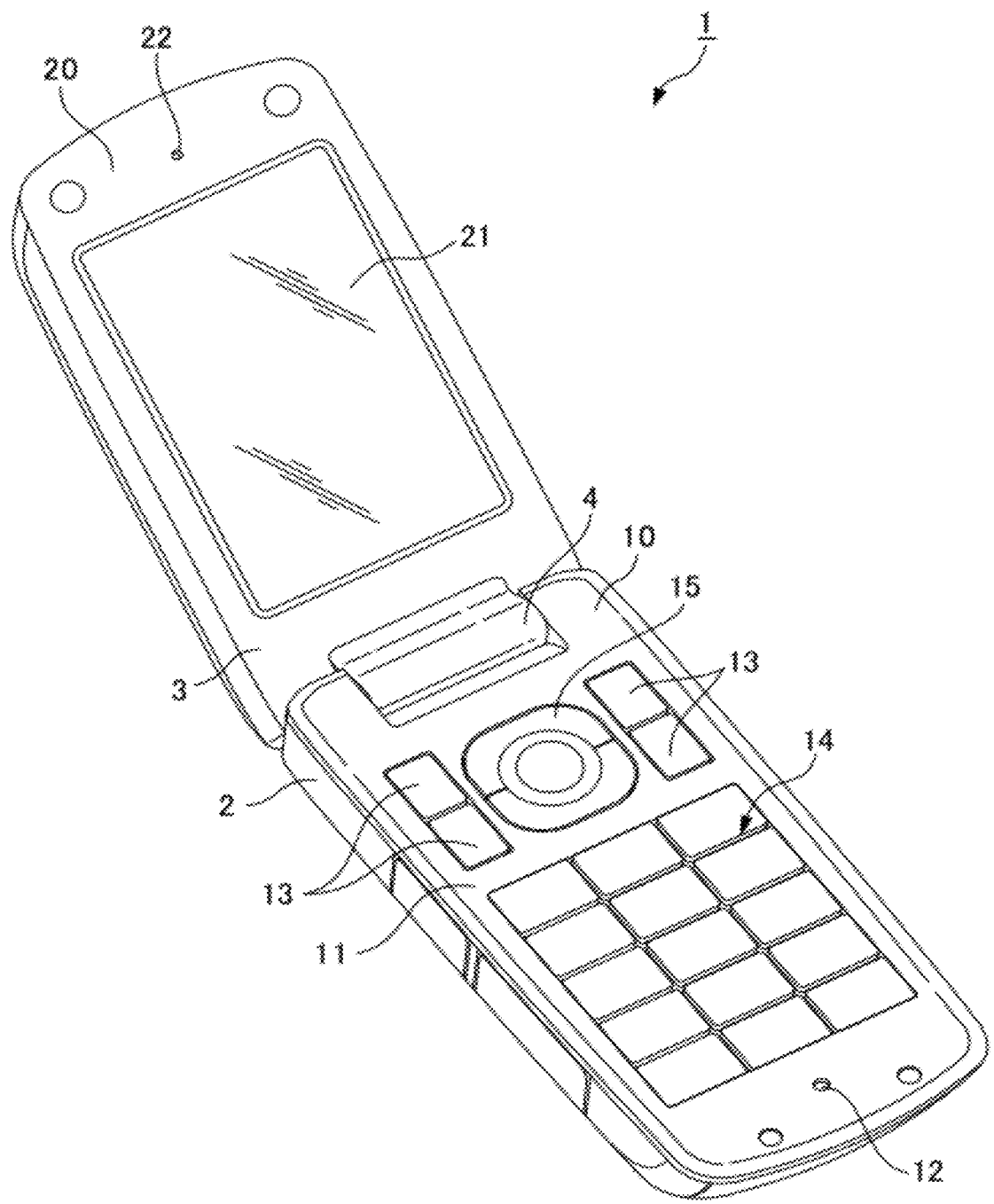
FIG. 1 is an external perspective view of a cellular telephone device according to an embodiment of the present invention.

FIG. 1 is an external perspective view of the cellular telephone device 1 according to the present embodiment.

The cellular telephone device 1 is configured to include an operation unit casing 2 and a display unit casing 3. The operation unit casing 2 is configured to include on a front face 10 thereof an operation unit 11 and a microphone 12 for voice input by a user of the cellular telephone device 1 during a phone call and during use of a speech recognition application. The operation unit 11 includes: feature setting operation buttons 13 for operating various settings and various features such as a telephone number directory feature and a mail feature; input operation buttons 14 for inputting digits of a telephone number and characters for mail; and a selection operation button 15 that performs selection of the various operations and scrolling.

In addition, the display unit casing 3 is configured to include, on a front face portion 20, a display unit 21 for displaying a variety of information, and a receiver 22 for outputting speech of the other party in a conversation.

An upper end portion of the operation unit casing 2 and a lower end portion of the display unit casing 3 are connected via a hinge mechanism 4. The cellular telephone device 1 can be in a state where the operation unit casing 2 and the display unit casing 3 are apart from each other (opened state), and in a state where the operation unit casing 2 and the display unit casing 3 are contacting each other (folded state), as the operation unit casing 2 and the display unit casing 3, connected via the hinge mechanism 4, pivot with respect to each other.

Figure 2:
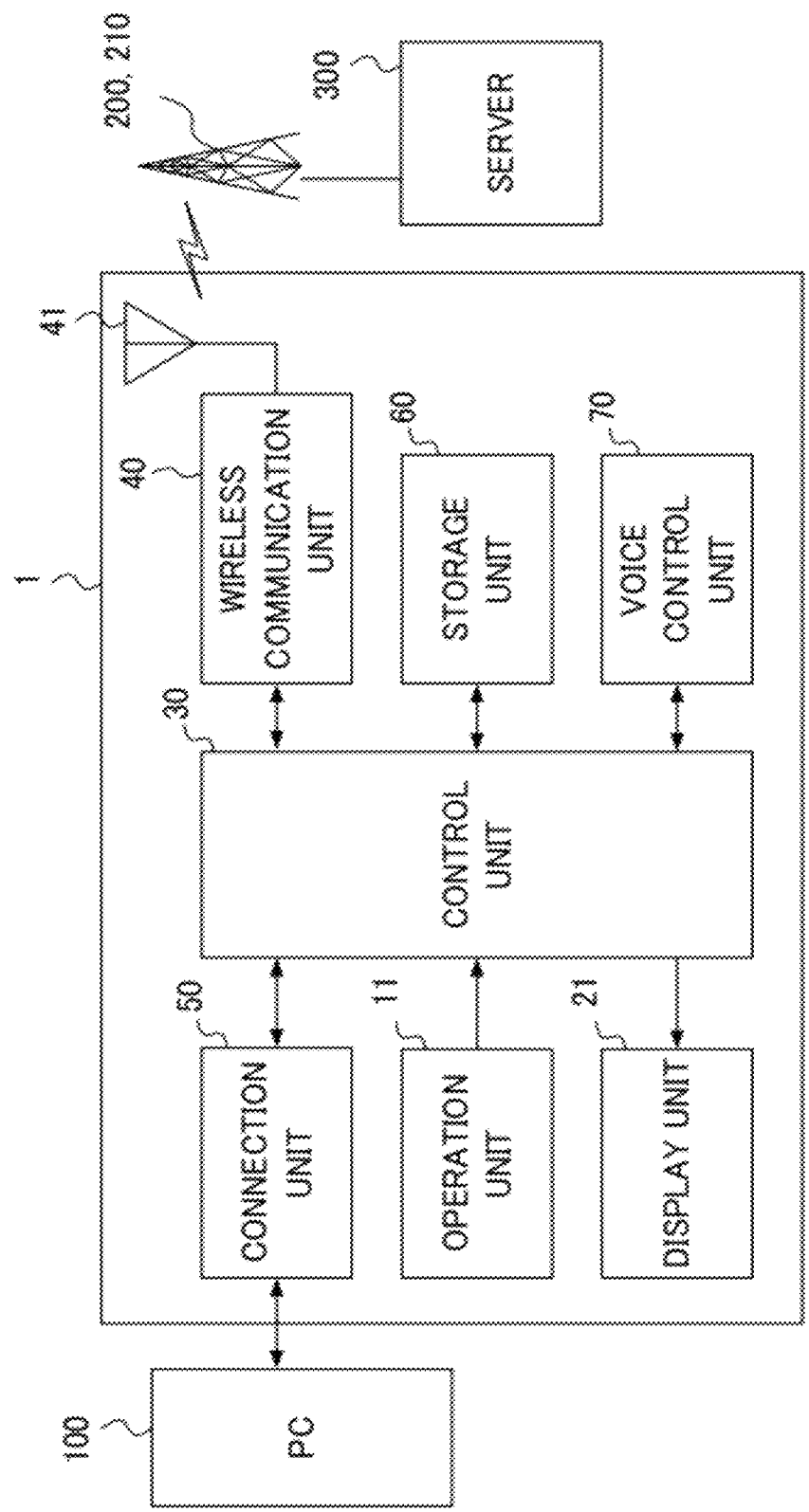
FIG. 2 is a block diagram showing features of the cellular telephone device according to the embodiment of the present invention.

FIG. 2 is a block diagram showing features of the cellular telephone device 1 according to the embodiment of the present invention. The cellular telephone device 1 includes: the operation unit 11; the display unit 21; a control unit 30; a wireless communication unit 40; the antenna 41; a connection unit 50; a storage unit 60; and a voice control unit 70.

The control unit 30 controls the entire cellular telephone device 1 and performs predetermined control with respect to the display unit 21, the wireless communication unit 40, the connection unit 50, the voice control unit 70 and the like. The control unit 30 also accepts input from the operation unit 11, the connection unit 50 and the like and performs various processes. When the processes are being performed, the control unit 30 reads various programs and data, and writes data by controlling the storage unit 60.

In the present embodiment, the control unit 30: provides data packets (TCP segment) received by the wireless communication unit 40 to the data processing device (hereinafter referred to as a PC 100) via the connection unit 50; and sends ACK packets, which has been received from the PC 100 via the connection unit 50 to a communication counterpart (hereinafter referred to as a server 300), by the wireless communication unit 40 via an LTE base station 200 (or a CDMA base station 210).

In addition, in a case in which communication quality represented by field intensity, an error correction ratio or the like is reduced to a first threshold in the communication system in use by the wireless communication unit 40, the control unit 30 attempts hand-off to another available communication system.

Here, in a case in which, while the PC 100 is receiving data from the server 300 by TCP, hand-down to a communication system of lower speed occurs due to reduction in communication quality, the control unit 30 performs control to reduce the RWIN to be notified to the server 300 from the size before hand-down. This process will be described later in detail.

The wireless communication unit 40 establishes communication with an external device (the LTE base station 200 or the CDMA base station 210) in a predetermined usable frequency band (for example, a 2 GHz band, an 800 MHz band or the like). The wireless communication unit 40 then performs demodulation processing of a signal received by the antenna 41, supplies the processed signal to the control unit 30, performs modulation processing of a signal supplied from the control unit 30, and submits the processed signal to the external device via the antenna 41.

Here, the wireless communication unit 40 corresponds to an LTE (a first communication system), which is a protocol for high-speed data communication, and CDMA2000_1x (a second communication system), which is a protocol for voice and data communication and is of lower speed (a higher probability of a low data rate) than the LTE. Clearly, CDMA2000_1x is an example and W-CDMA can also be used. The wireless communication unit 40 establishes connection to the server 300, which is a communication counterpart of the PC 100, using any communication system that utilizes these protocols, based on an instruction from the control unit 30, and performs transmission of data.

The connection unit 50 is an interface connected to the PC 100, for example a USB terminal.

The storage unit 60 includes, for example, working memory and is used for arithmetic processing by the control unit 30. The storage unit 60 stores various programs according to the present embodiment. The storage unit 60 also stores a copy of the acknowledge (ACK) packet that has been forwarded from the PC 100 to the server 300 under control of the control unit 30.

The voice control unit 70 performs predetermined sound processing with respect to the signal supplied from the wireless communication unit 40 according to control by the control unit 30, and outputs the signal thus processed to the receiver 22. The receiver 22 outputs the signal supplied from the voice control unit 70 to the outside. The signal can also be output from a speaker (not illustrated) instead of, or along with, the receiver 22.

In addition, the voice control unit 70 processes the signal being input from the microphone 12 according to control by the control unit 30 and outputs the signal thus processed to the wireless communication unit 40. The wireless communication unit 40 performs predetermined processing with respect to the signal supplied from the voice control unit 70 and outputs the signal thus processed from the antenna 41.

Processing by the control unit 30 of the cellular telephone device 1 is described in detail hereinafter.

The control unit 30 receives the ACK packet, which has been sent from the PC 100 in response to a TCP segment received from the server 300, from the connection unit 50 and then forwards the ACK packet to the server 300 after rewriting the RWIN specified in a TCP header of the ACK packet.

Figure 3:
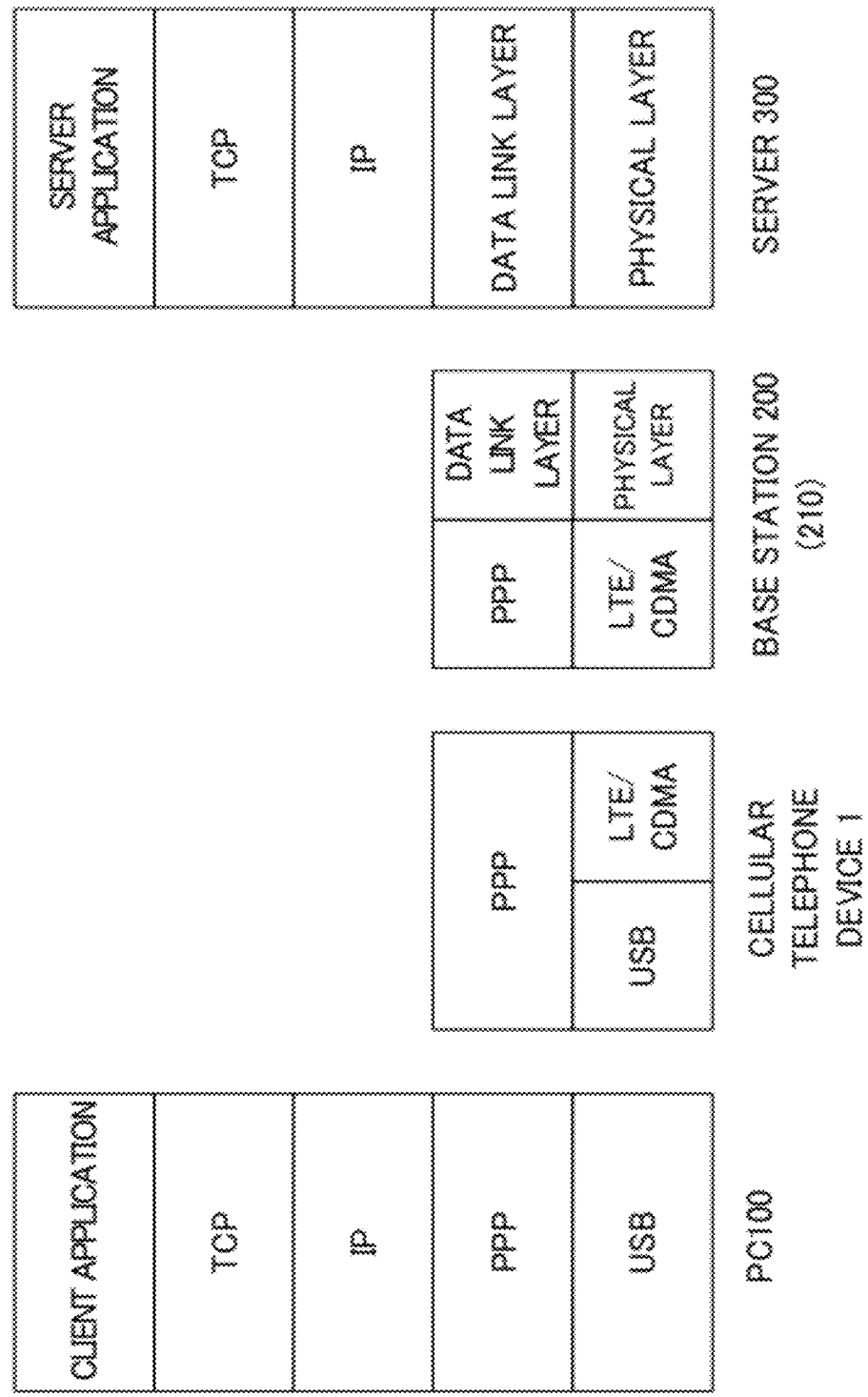
FIG. 3 is a diagram showing a hierarchic structure of a communication protocol according to the embodiment of the present invention.

FIG. 3 is a diagram showing a typical hierarchic structure of a communication protocol between the PC 100 and the server 300 according to the present embodiment.

The PC 100 and the cellular telephone device 1 are connected to each other including USB in the physical layer and PPP in the data link layer. The cellular telephone device 1 and the LTE base station 200 or the CDMA base station 210 are connected to each other including LTE or CDMA in the physical layer and PPP in the data link layer. The PC 100 and the server 300 are connected to each other by including IP in the network layer and TCP in the transport layer. In addition, a client application and a server application are present in a higher level layer.

The control unit 30 rewrites the RWIN included in the TCP header generated by the TCP, by the PPP in the lower level layer, to be forwarded.

More specifically, in a case in which the communication quality of the wireless communication unit 40 by the LTE is reduced to a second threshold that is greater than the first threshold, the control unit 30 determines that the probability of hand-down to the CDMA2000_1x is increased and rewrites the RWIN to be notified to the server 300, to 0. As a result, transmission of data packets from the server 300 is stopped.

Here, hand-down from the LTE to the CDMA2000_1x indicates severe deterioration of LTE wireless environment and even a packet having the RWIN of 0 may fail to reach the server 300. Given this, the control unit 30 starts adjusting the RWIN when the communication quality is reduced to the second threshold, even before hand-down.

In addition, when the communication quality of the wireless communication unit 40 in the LTE is reduced to the first threshold that is smaller than the second threshold and hand-down to the CDMA2000_1x occurs, the control unit 30 rewrites the RWIN to a value usable in the communication system after hand-down. In other words, since the CDMA is far lower in data rate than the LTE, the control unit 30 results in rewriting the RWIN to a value smaller than that before the hand-down. Here, if an OS (operation system) of the PC 100 has an RWIN automatic adjustment function, the RWIN may be adjusted in the TCP layer to a value suitable for a low speed band, after the hand-down. If the RWIN specified in the ACK packet sent from the PC 100 has a size usable in the communication system after hand-down, the control unit 30 forwards the ACK packet without rewriting the RWIN.

On the other hand, if the communication quality of the wireless communication unit 40 recovers after setting the RWIN to be notified to the server 300 to 0, and no hand-down to the CDMA2000_1x occurs, the high-speed communication can be maintained and therefore the control unit 30 restores the RWIN to the value before setting to 0 and forwards the ACK packet.

Here, if the communication quality of the wireless communication unit 40 frequently moves up and down in the vicinity of the second threshold, the RWIN also changes frequently. In order to suppress such change, the control unit 30 sets hysteresis by defining and storing a minimum time interval between the last and next RWIN adjustment, a third threshold indicating recovery of communication quality, and the like.

In addition, in a case in which a subsequent ACK packet is not sent from the PC 100 for a predetermined time period after setting the RWIN to be notified to the server 300 to 0, the control unit 30 forwards the copy of an ACK packet stored in the storage unit 60 after rewriting the RWIN specified therein to a non-zero value (a value suitable for the line speed). If the RWIN remains 0, the server 300 detects abnormality in communication and the TCP connection may be interrupted. Control by the control unit 30 can prevent the interruption of the TCP connection.

The ACK packet may be header-compressed (VJ compressed) by omitting unchanged items in the TCP header for compression of size. In a case in which the RWIN that needs to be rewritten is not specified in the ACK packet sent from the PC 100 due to compression, the control unit 30 converts the compressed ACK packet to an uncompressed ACK packet with the RWIN specified, and then forwards the ACK packet after rewriting the RWIN.

Figure 4:
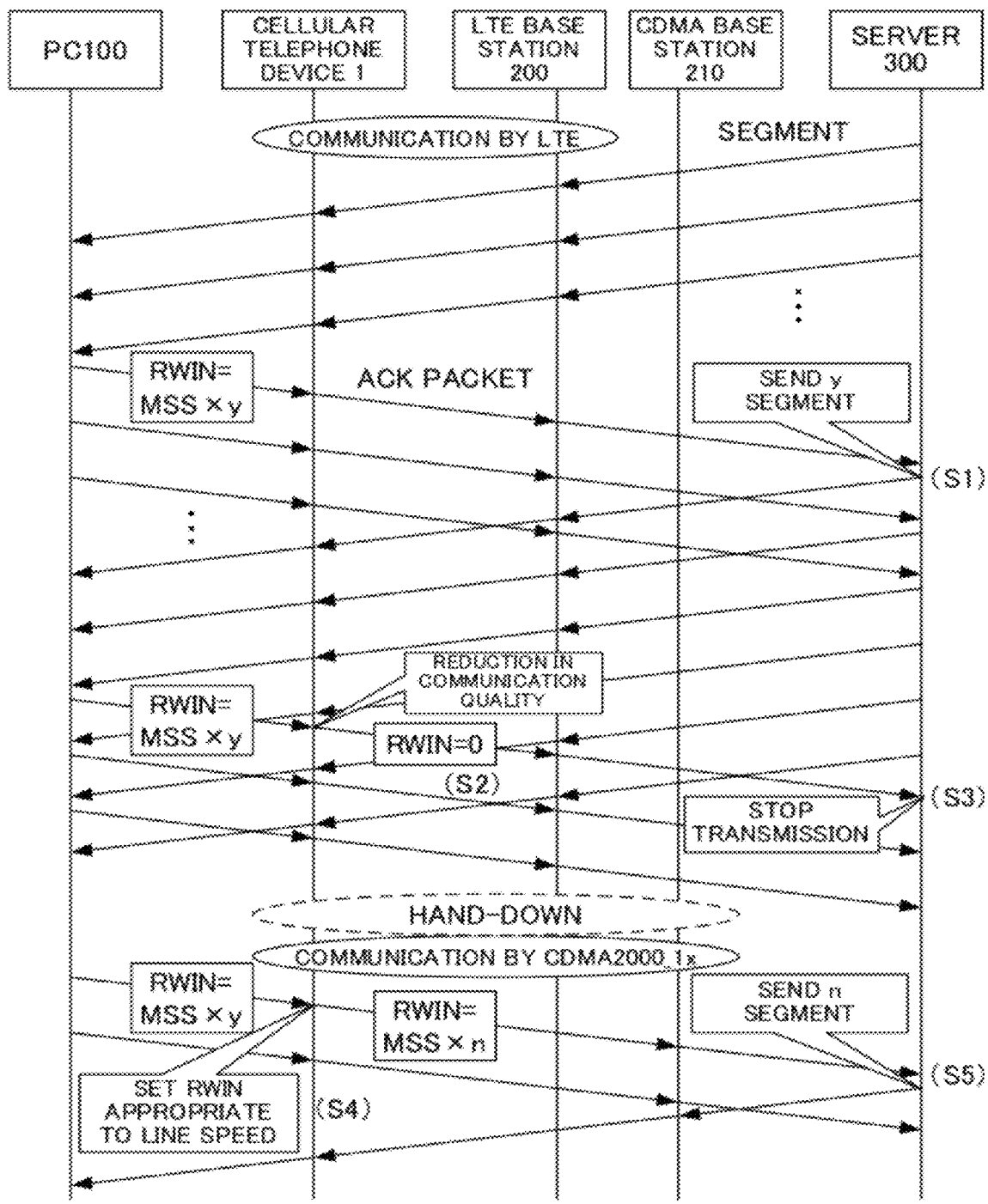
FIG. 4 is a sequence diagram showing processing in a case in which hand-down occurs according to the embodiment of the present invention.

FIG. 4 is a sequence diagram showing processing in a case in which hand-down occurs during communication between the PC 100 and the server 300 according to the present embodiment.

While the cellular telephone device 1 and the LTE base station 200 communicate by the LTE, the PC 100 sends an ACK packet with "RWIN=MSS×y" in response to the TCP segment sent from the server 300. The server 300 then sends a y segment to the PC 100 according to the RWIN thus notified (=MSS×y) (Step S1).

When the communication quality with respect to the LTE base station 200 is reduced in the cellular telephone device 1, the cellular telephone device 1 makes a copy of the ACK packet sent from the PC 100 and sends the copy to the server 300 after rewriting the RWIN to 0 (Step S2).

After receiving the ACK packet with "RWIN=0", the server 300 stops sending a segment to the PC 100 (Step S3).

If the communication quality in the cellular telephone device 1 is further reduced and hand-down to the CDMA base station 210 occurs, the RWIN (=MSS×y) notified by the PC 100 is not appropriate to the CDMA2000_1x, which is a lower speed line. Given this, the cellular telephone device 1 makes a copy of the ACK packet received from the PC 100 and sends the copy to the server 300 after rewriting the RWIN to "RWIN=MSS×n", which is appropriate to the line (Step S4).

Subsequently, the server 300 sends an n segment to the PC 100 according to the RWIN thus notified (=MSS×n) (Step S5).

Figure 5:
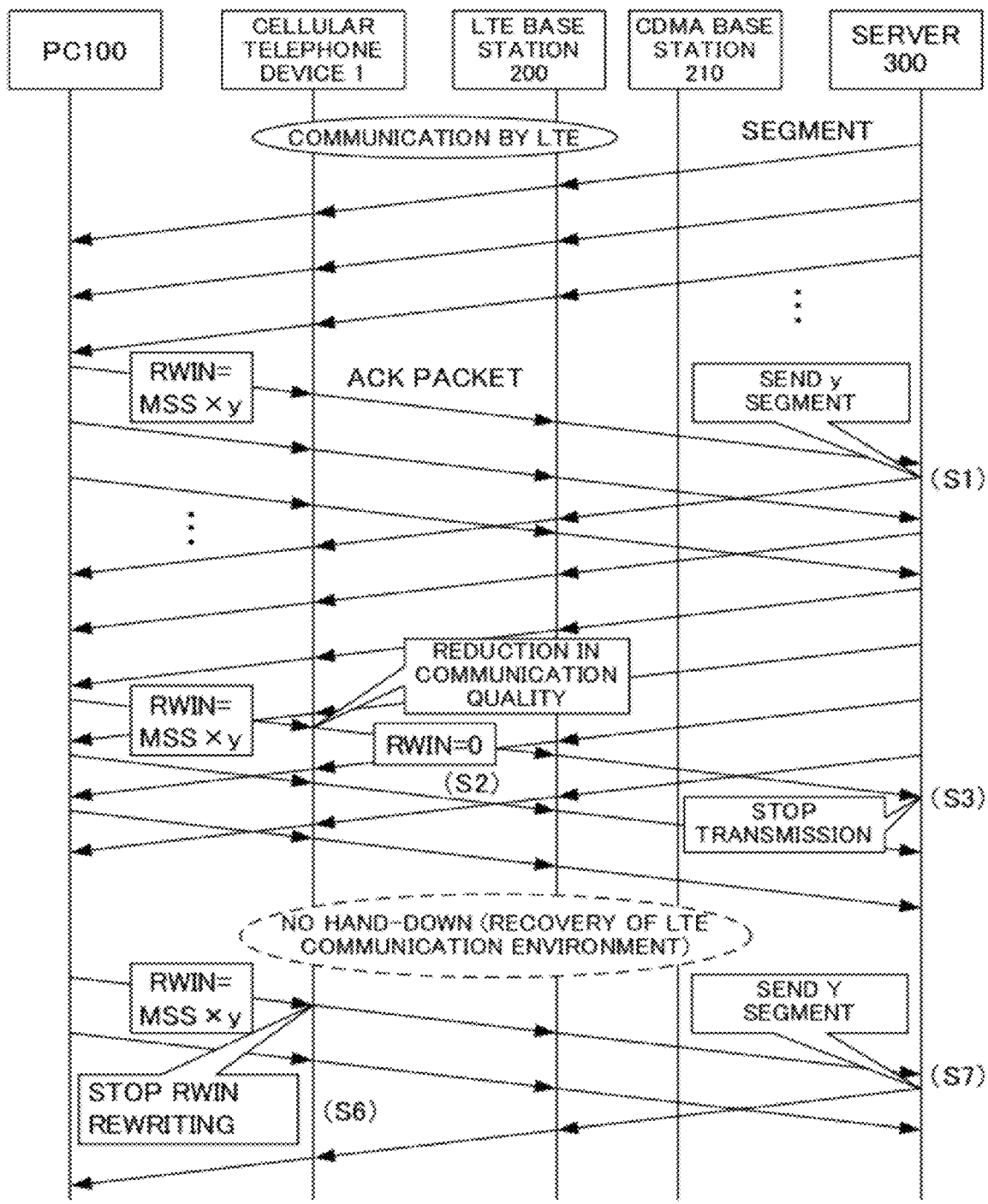
FIG. 5 is a sequence diagram showing processing in a case in which hand-down does not occur according to the embodiment of the present invention.

FIG. 5 is a sequence diagram showing processing in a case in which the reduced communication quality recovers and no hand-down occurs during communication between the PC 100 and the server 300 according to the present embodiment.

As in the example of FIG. 4, if the communication quality is reduced in the cellular telephone device 1 during transmission of a TCP segment from the server 300 to the PC 100 (Step S1), the RWIN is rewritten to 0 (Step S2), and the server 300 stops sending the TCP segment (Step S3).

Thereafter, if the communication quality with respect to the LTE base station 200 recovers in the cellular telephone device 1, the high speed communication by the LTE is maintained. In this case, the RWIN notified from the PC 100 (=MSS×y) is a value appropriate to the high speed line. The cellular telephone device 1 therefore forwards the ACK packet to the server 300 without rewriting the RWIN (Step S6).

The server 300 then sends a y segment to the PC 100 according to the RWIN thus notified (=MSS×y) (Step S7).

Figure 6:
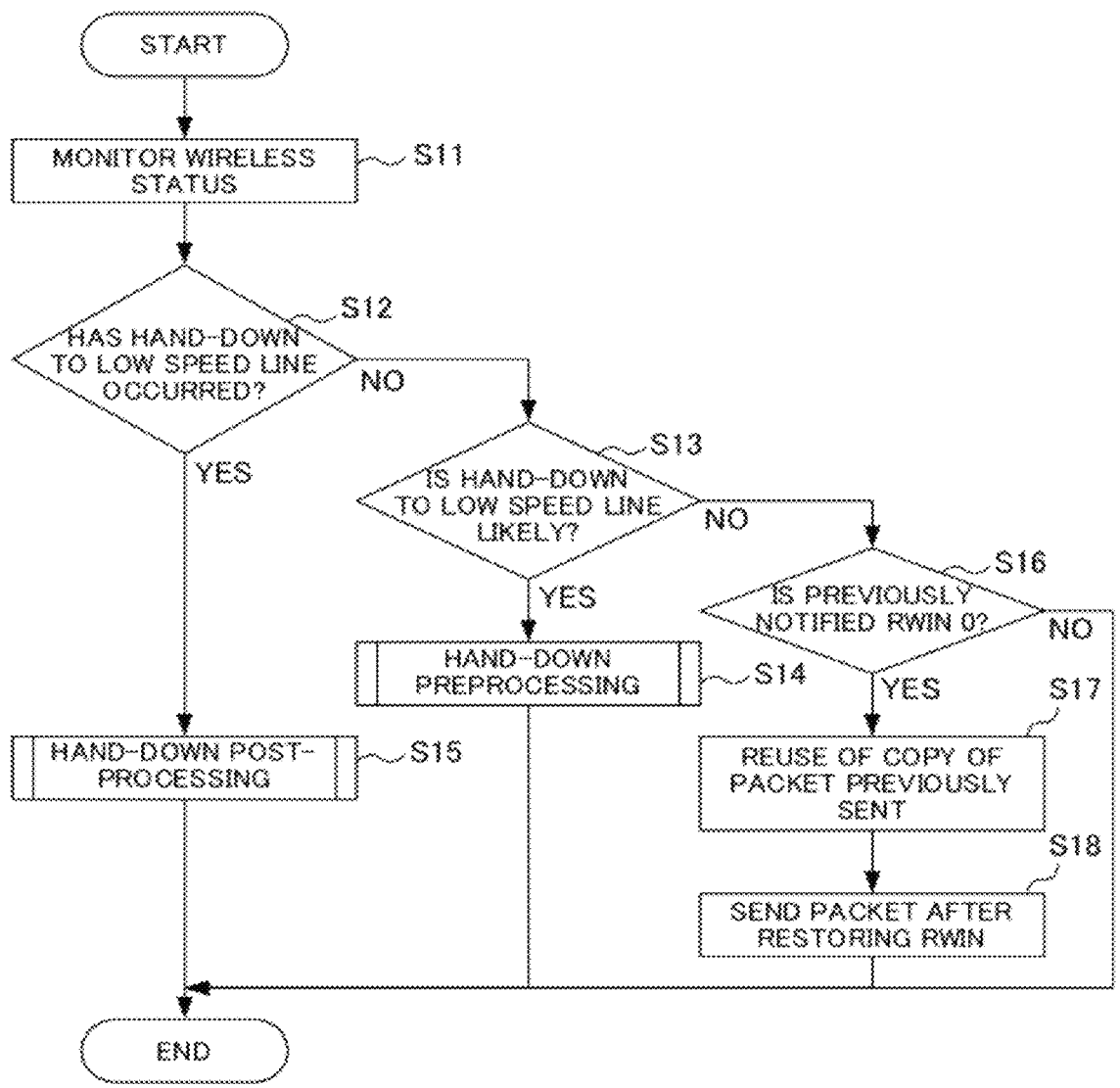
FIG. 6 is a flow chart showing processing by the cellular telephone device according to the embodiment of the present invention.

FIG. 6 is a flow chart showing processing by the cellular telephone device 1 according to the present embodiment. This processing is repeated while the PC 100 receives data from the server 300.

In Step S11, the control unit 30 monitors wireless status and evaluates the communication quality of the wireless communication unit 40 in the current communication system.

In Step S12, the control unit 30 determines whether the communication quality evaluated in Step S11 is reduced to the first threshold or lower and hand-down to the CDMA2000_1x, which is a lower speed line, occurs. If a result of the determination is YES, the control unit 30 advances the processing to Step S15; and if NO, the control unit 30 advances the processing to Step S13.

In Step S13, the control unit 30 determines whether the communication quality evaluated in Step S11 is reduced to the second threshold that is higher than the first threshold and whether hand-down to a lower speed line is likely. If a result of the determination is YES, the control unit 30 advances the processing to Step S14; and if NO, the control unit 30 advances the processing to Step S16.

In Step S14, the control unit 30 performs hand-down preprocessing (described later in FIG. 7) and adjusts the RWIN in preparation for hand-down to a lower speed line.

In Step S15, the control unit 30 performs hand-down postprocessing (described later in FIG. 8) and adjusts the RWIN to a value appropriate to communication by a lower speed line.

In Step S16, the control unit 30 determines whether the RWIN previously notified to the server 300 is 0 as a result of adjustment of the RWIN in the hand-down preprocessing. If a result of the determination is YES, the control unit 30 advances the processing to Step S17; and if NO, the control unit 30 terminates the processing as the RWIN does not need to be rewritten.

In Step S17, the control unit 30 reads from the storage unit 60 the copy of the ACK packet that has been previously sent to the server 300, for reuse.

In Step S18, the control unit 30 restores the RWIN in the copy of ACK packet read in Step S17 to a value before rewriting in the hand-down preprocessing and sends the copy to the server 300.

Figure 7:
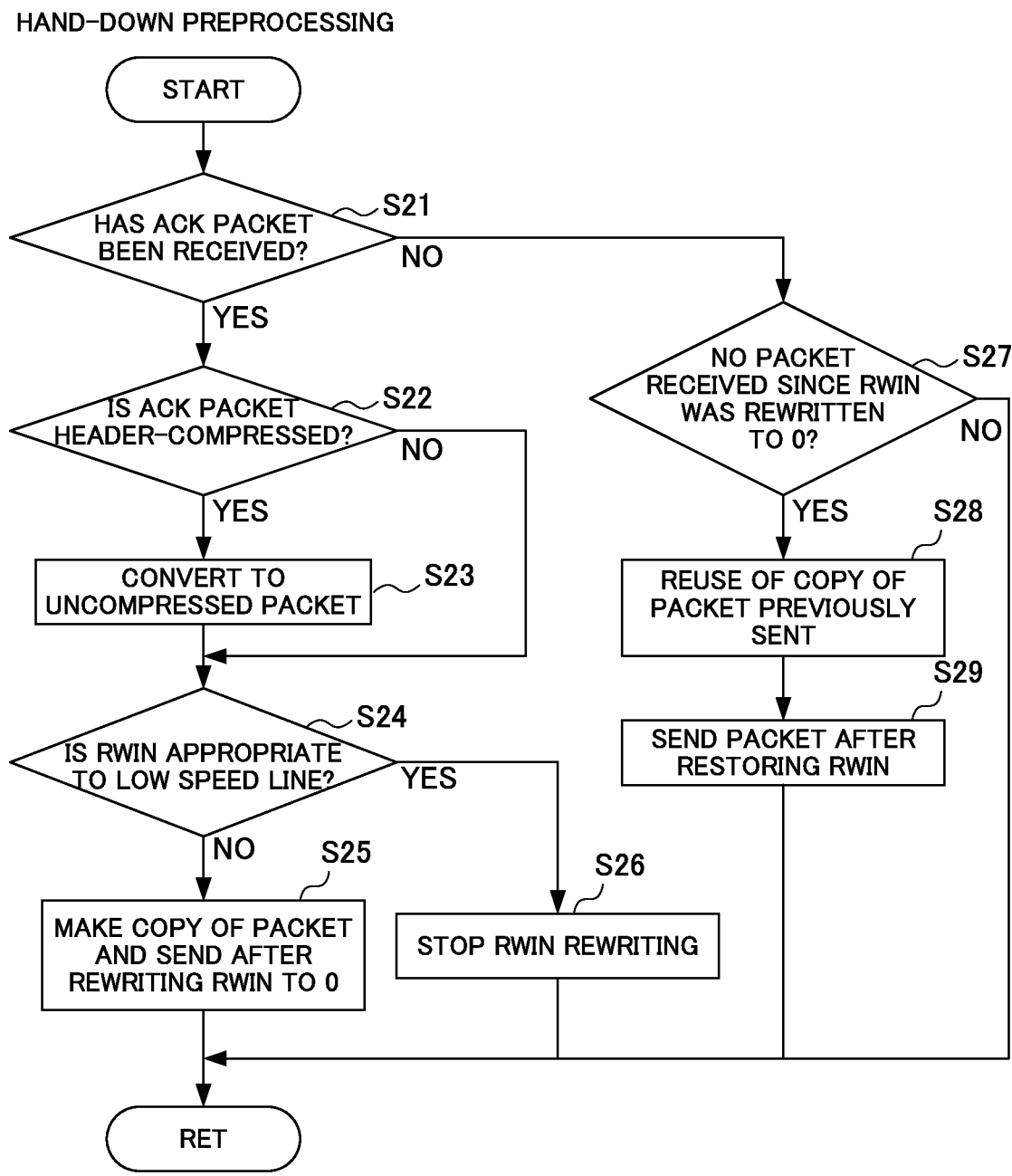
FIG. 7 is a flow chart showing hand-down preprocessing according to the embodiment of the present invention.

FIG. 7 is a flow chart showing hand-down preprocessing by the cellular telephone device 1 according to the present embodiment. This processing corresponds to Step S14 in FIG. 6.

In Step S21, the control unit 30 determines whether an ACK packet is received from the PC 100. If a result of the determination is YES, the control unit 30 advances the processing to Step S22; and if NO, the control unit 30 advances the processing to Step S27.

In Step S22, the control unit 30 determines whether the ACK packet received from the PC 100 is header-compressed. If a result of the determination is YES, the control unit 30 advances the processing to Step S23; and if NO, the control unit 30 advances the processing to Step S24.

In Step S23, the control unit 30 converts the header-compressed ACK packet received from the PC 100 to an uncompressed packet.

In Step S24, the control unit 30 determines whether the RWIN in the ACK packet received from the PC 100 is appropriate to a low speed line. If a result of the determination is NO, the control unit 30 advances the processing to Step S25; and if YES, the control unit 30 advances the processing to Step S26.

In Step S25, the control unit 30 copies the ACK packet received from the PC 100 and sends the copy to the server 300 after rewriting the RWIN to 0.

In Step S26, since the RWIN appropriate to a low speed line is notified from the PC 100, the control unit 30 stops RWIN rewriting processing (hand-down preprocessing and hand-down postprocessing) for avoiding redundant flow control with the PC 100.

In Step S27, the control unit 30 determines whether no ACK packet is received from the PC 100 for a predetermined period of time after rewriting the RWIN to 0 in Step S25. If a result of the determination is YES, the control unit 30 advances the processing to Step S28; and if NO, the control unit 30 terminates the processing.

In Step S28, the control unit 30 reads from the storage unit 60 the copy of the ACK packet that has been previously sent to the server 300, for reuse.

In Step S29, the control unit 30 restores the RWIN in the copy of ACK packet read in Step S28 to a value before rewriting in step S25 and sends the copy to the server 300.

Figure 8:
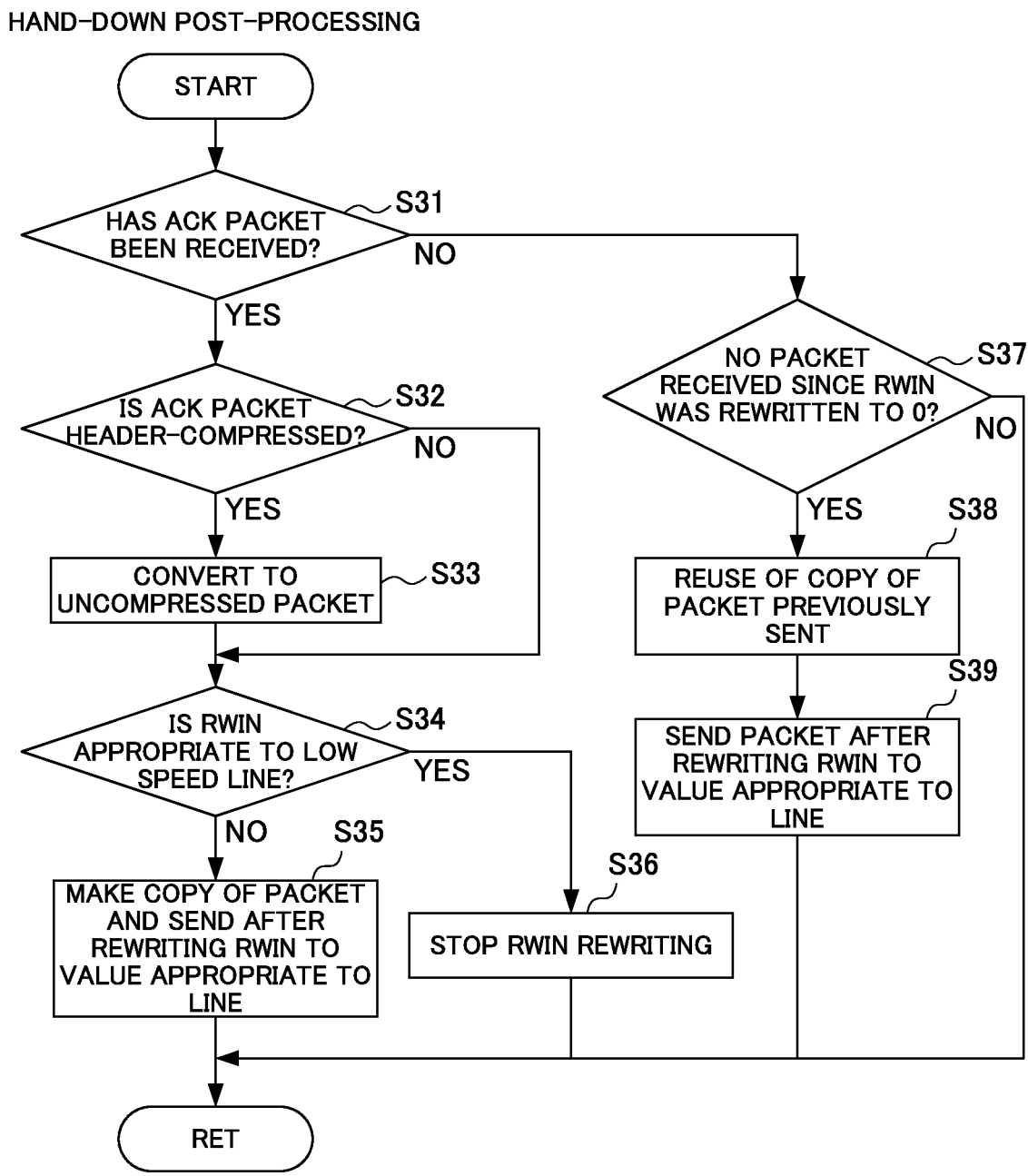
FIG. 8 is a flow chart showing hand-down postprocessing according to the embodiment of the present invention.

FIG. 8 is a flow chart showing hand-down postprocessing by the cellular telephone device 1 according to the present embodiment. This processing corresponds to Step S15 in FIG. 6.

In Step S31, the control unit 30 determines whether an ACK packet is received from the PC 100. If a result of the determination is YES, the control unit 30 advances the processing to Step S32; and if NO, the control unit 30 advances the processing to Step S37.

In Step S32, the control unit 30 determines whether the ACK packet received from the PC 100 is header-compressed. If a result of the determination is YES, the control unit 30 advances the processing to Step S33; and if NO, the control unit 30 advances the processing to Step S34.

In Step S33, the control unit 30 converts the header-compressed ACK packet received from the PC 100 to an uncompressed packet.

In Step S34, the control unit 30 determines whether the RWIN in the ACK packet received from the PC 100 is appropriate to a low speed line. If a result of the determination is NO, the control unit 30 advances the processing to Step S35; and if YES, the control unit 30 advances the processing to Step S36.

In Step S35, the control unit 30 copies the ACK packet received from the PC 100 and sends the copy to the server 300 after rewriting the RWIN to a predetermined value appropriate to a low speed line.

In Step S36, since the RWIN appropriate to a low speed line is notified from the PC 100, the control unit 30 stops RWIN rewriting processing (hand-down preprocessing and hand-down postprocessing) for avoiding redundant flow control with the PC 100.

In Step S37, the control unit 30 determines whether no ACK packet is received from the PC 100 for a predetermined period of time after rewriting the RWIN to 0 in Step S25. If a result of the determination is YES, the control unit 30 advances the processing to Step S38; and if NO, the control unit 30 terminates the processing.

In Step S38, the control unit 30 reads from the storage unit 60 the copy of the ACK packet that has been previously sent to the server 300, for reuse.

In Step S39, the control unit 30 restores the RWIN in the copy of ACK packet read in Step S38 to a value appropriate to a low speed line as in Step S35, and sends the copy to the server 300.

As described above, according to the present embodiment, the cellular telephone device 1 rewrites the RWIN of the ACK packet to a value for a low speed line (for example, CDMA2000_1x) in a case in which hand-down to the low speed line occurs while the RWIN for a high speed line (for example, LTE) is notified. The cellular telephone device 1 can thus prevent reduction of throughput due to data packet loss, to thereby improve throughput to a potential throughput of the low speed line, without changing the TCP layer of the PC 100.

In addition, the cellular telephone device 1 can prevent redundant flow control by not rewriting the RWIN if the RWIN is adjusted by the PC 100 to a value appropriate to a low speed line.

Furthermore, in a state in which communication quality has deteriorated and hand-down is likely, the cellular telephone device 1 stops data transmission from the server 300 by setting the RWIN to 0 before hand-down occurs. In other words, the cellular telephone device 1 can stop data transmission from the server 300 before hand-down occurs and can suppress data loss due to hand-down. In addition, the cellular telephone device 1 can maintain high-speed communication by restoring the RWIN to an original value and gives notification of the RWIN to the server 300 if the communication quality of the high speed line has recovered after rewriting the RWIN to 0.

Furthermore, if an ACK packet for notifying the RWIN to the server 300 cannot be obtained from the PC 100, the cellular telephone device 1 can give notification of the RWIN to the server 300 by reusing a copy of the ACK packet previously sent.

Moreover, even if the RWIN is not specified in an ACK packet due to header compression, the cellular telephone device 1 can give notification of the adjusted RWIN to the server 300 by converting the compressed ACK packet to an uncompressed ACK packet.

An embodiment of the present invention has been described above, but the present invention is not limited thereto. In addition, the effects described in the embodiment of the present invention are merely examples of a desirable effect of the present invention and effects of the present invention are not limited thereto.

Although LTE has been described as a high speed communication system and CDMA2000_1x has been described as a low speed communication system in the embodiment, the present invention is not limited thereto. The present invention can be applied to various combinations of communication systems with different line speeds, for example WiMAX and W-CDMA; wireless LAN and CDMA2000_1x; and the like, as long as hand-down is possible in the combinations while maintaining communication with a counterpart.

Furthermore, the wireless communication device according to the present invention is not limited to the cellular telephone device 1 and clearly can be: a PHS (Personal Handyphone System, registered trademark); a communication module that is connected to an in-car computer; a data communication terminal that establishes wireless communication while being directly connected to a PC by a USB or PCMCIA.

Although the cellular telephone device 1 in the embodiment is foldable by the hinge mechanism 4, the present invention is not limited thereto. The cellular telephone device 1 may be, for example, a slider type in which one of the casings slides to one direction in a state in which the operation unit casing 2 and the display part casing 3 are mutually superimposed; a rotating (turning) type in which one of the casings is rotated around an axis line along the direction of superimposition of the operation unit casing 2 and the display part casing 3; and a type (straight type) in which the operation unit casing 2 and the display part casing 3 are disposed in one casing without having the connecting portion. Moreover, the cellular telephone device 1 may be a so-called biaxial hinge type that can be opened and closed as well as rotated.

EXPLANATION OF REFERENCE NUMERALS

1 Cellular telephone device (Wireless communication device)
11 Operation unit
21 Display unit
30 Control unit
40 Wireless communication unit
41 Antenna
50 Connection unit
60 Storage unit
70 Voice control unit
100 PC (Data processing device)
200 LTE base station
210 CDMA base station
300 Server (Communication counterpart)

The invention claimed is:

1. A wireless communication device that is connected to a data processing device and provides data received from a predetermined communication counterpart via wireless communication to the data processing device, the wireless communication device comprising:

a wireless communication unit that establishes data communication by connecting to the communication counterpart in any of a first communication system and a second communication system that is of lower speed than the first communication system; and a control unit that reduces a size of a receiving window, which is sent by the data processing device, to be notified to the communication counterpart when the wireless communication unit performs handoff from the first communication system to the second communication system.

2. The wireless communication device according to claim 1, wherein the size of the receiving window is specified in an acknowledge packet that is sent by the data processing device in response to a data packet received from the communication counterpart; and the control unit rewrites the receiving window size specified in the acknowledge packet and forwards the acknowledge packet to the communication counterpart.

3. The wireless communication device according to claim 2, wherein the control unit forwards the acknowledge packet without rewriting the size of the receiving window in a case in which the receiving window size specified in the acknowledge packet is usable in the second communication system.

4. The wireless communication device according to claim 2, wherein, in a case in which the communication quality by the wireless communication unit in the first communication system is reduced to a second threshold that is higher than a first threshold, the control unit sets the receiving window size to be notified to the communication counterpart to 0.

5. The wireless communication device according to claim 4, wherein, in a case in which handoff to the second communication system occurs after setting the receiving window size to 0, the control unit gives notification of the receiving window size that is usable in the second communication system.

6. The wireless communication device according to claim 4, wherein, in a case in which handoff to the second communication system does not occur after setting the receiving window size to 0, the control unit gives notification of the receiving window size value before being set to 0.

7. The wireless communication device according to claim 4, further comprising a storage unit that stores a copy of the acknowledge packet forwarded by the control unit, wherein, in a case in which a subsequent acknowledge packet is not sent from the data processing device for a predetermined amount of time after setting the receiving window size to 0, the control unit forwards the copy of the acknowledge packet stored in the storage unit after rewriting the receiving window size specified therein.

8. The wireless communication device according to claim 2, wherein, in a case in which the acknowledge packet sent from the data processing device is compressed, the control unit converts the compressed acknowledge packet into an uncompressed acknowledge packet in which the receiving window size is specified, and then forwards the acknowledge packet after rewriting the receiving window size.

9. The wireless communication device according to claim 1, wherein the receiving window size is a window size to be notified to the communication counterpart in a TCP layer.

10. A control method in which a wireless communication device that is connected to a data processing device provides data received from a predetermined communication counterpart via wireless communication to the data processing device, the wireless communication device including a wireless communication unit that establishes data communication by connecting to the communication counterpart in any of a first communication system and a second communication system that is of lower speed than the first communication system, the control method comprising reducing a size of a receiving window, which is sent by the data processing device, to be notified to the communication counterpart when the wireless communication unit performs handoff from the first communication system to the second communication system.

* * * * *